United States Patent [19]

Hendricks

[11] 4,410,967

[45] Oct. 18, 1983

[54] METHOD FOR SAMPLING FLYING INSECT POPULATIONS USING LOW-FREQUENCY SOUND DETECTING AND RANGING IN CONJUNCTION WITH A BIOLOGICALLY ACTIVE CHEMICAL/PHEROMONE

[75] Inventor: Donovan E. Hendricks, Brownsville, Tex.

[73] Assignee: The United States of America as represented by the Secretary of Agriculture, Washington, D.C.

[21] Appl. No.: 290,540

[22] Filed: Aug. 6, 1981

[51] Int. Cl.³ .............................................. G01S 15/02
[52] U.S. Cl. ...................................... 367/87; 367/108
[58] Field of Search ................... 367/87, 93, 99, 107, 367/108; 43/107

[56] References Cited

U.S. PATENT DOCUMENTS 4,179,839  12/1979  Salotti et al. ........................... 43/112
4,225,951   9/1980  Menin et al. ...................... 367/108 X

OTHER PUBLICATIONS

Thomas M. Frederiksen and William N. Howard, "A Single-Chip Monolithic Sonar System", IEEE Journal of Solid State Circuits, vol. Sc-9, No. 6, Dec. 1974, pp. 394-403.
A. W. Hartstack, J. A. Wiltz and D. R. Buck, "Moth Traps for the Tobacco Budworm", vol. 72, No. 4.
D. E. Hendricks, A. W. Hartstack and T. N. Shaver, "Effect of Formulation and Dispensers on Attractiveness of Virelure to the Tobacco Worm".
D. A. Lindquist, "Where Are We Going in the Biological Sciences", ESA Bulletin, vol. 24, No. 2 (1978), p. 213.
D. E. Hendricks, "Low-Frequency Sodar Device That Counts Flying Insects Attracted to Sex Pheromone Dispensers", Aug. 1980, published Oct. 1980.

Primary Examiner—Richard A. Farley
Attorney, Agent, or Firm—M. Howard Silverstein; David G. McConnell; Raymond C. Von Bodungen

[57]  ABSTRACT

A unique method for detecting and sampling flying insect populations is disclosed. An agricultural area is baited with a specific sex pheromone of a specific flying insect. When the flying insect is lured into range of the bait, a low-frequency sound is transmitted into contact with the insect. The sound is received in a counting means and the detection of the insect stored. Accumulated detections over a period of time form a population sampling of the insect studied.

1 Claim, 2 Drawing Figures

METHOD FOR SAMPLING FLYING INSECT POPULATIONS USING LOW-FREQUENCY SOUND DETECTING AND RANGING IN CONJUNCTION WITH A BIOLOGICALLY ACTIVE CHEMICAL/PHEROMONE

BACKGROUND OF THE INVENTION (1) Field of the Invention

This invention relates to a method for sampling flying insect populations.

(2) Description of the Prior Art

Heretofore, it has not been known that the use of low-frequency sound could be used to detect flying insects. More specifically, the use of low-frequency sound detection to detect and count flying insects in conjunction with a biologically active sex-attractant chemical to lure and bait an agricultural area so that the sound detection device might work is new in the field of insect population sampling.

Flying moths have been caught and counted by entomologists in various types of insect survey traps for more than 40 years. The most popular traps have been equipped with bulbs that emit attractive electromagnetic (light) wavelengths, including blacklight, or traps baited with sex attractants from live insects or from synthetic chemical dispensers. Insects also have been detected by various high power ground-based radar installations and their dispersal tracked by continuously monitoring the coordinants of radar echos from the insect targets. Most of the radar equipment used to detect insects to date is ultra high frequency ($\lambda = 3$ to 15 cm), high powered in the kilo or megawatt region, and insect detection is only incidental to the proprietary operation of the radar installations.

A system was needed to automatically detect flying insects responsive to sex attractants that otherwise might not be caught in traps. Effectiveness of chemical sex attractants used as bait in insect traps is dependent upon the biological attractive potency of the chemical, dispersion characteristics of the chemical, and response behavior of the insect including flight patterns. All of these factors influence the overall performance of a particular pheromone lure/bait as does the bait's design. No lure baited with pheromone or equipped with an attractive light source can be expected to attract every insect that may respond since insects respond through a gradient of behaviourisms. For example, male tobacco budworm moths [*Heliothis virescens* (F.)] responsive to a pheromone source may fly toward and land several feet from a pheromone dispenser in a trap, or they may not physically react at all for a given night, or they may fly to the attractive source as they become attracted by the lure.

SUMMARY OF THE INVENTION

A detection method using echoes from low power sonic transmissions (SODAR) in conjunction with sex pheromones can provide a count of flying insects that is uniquely dependent upon the species-specific pheromone used as bait at the sonic transmission site, and therefore, represents densities of a single flying species, moths for example. If SODAR range (i.e., 200 m, maximum), azimuth, and direction is adjusted to coincide with the typical downwind plume of pheromone chemical from its dispenser, then, statistical confidence of counts based on echoes from responsive flying insects is high enough to make SODAR detection species specific and practical. Also, detection of group insect flight activity above and unique to homologous cultivated host plants (10 acres of cultivated corn or cotton, for example) could be correlated with host plant insect damage and infestation levels.

The purpose in this work is to provide a low power, battery operated SODAR transceiver device sensitive enough to detect and count flying moths lured by sex attractant dispensed at the sonic transmission site.

The instant invention comprises the following steps: (1) baiting an agricultural area with a pheromone specific to a flying insect species; (2) luring said flying insect into range of a sound detecting transceiver by means of said pheromone; (3) transmitting a low-frequency sound wave into contact with said flying insect; (4) receiving said sound wave back into a detector and producing a record of said insect; (5) recording the sound wave echoes over a period of time to produce a sampling means for determining flying insect populations.

DESCRIPTION OF THE PREFERRED EMBODIMENTS

Figure 1:
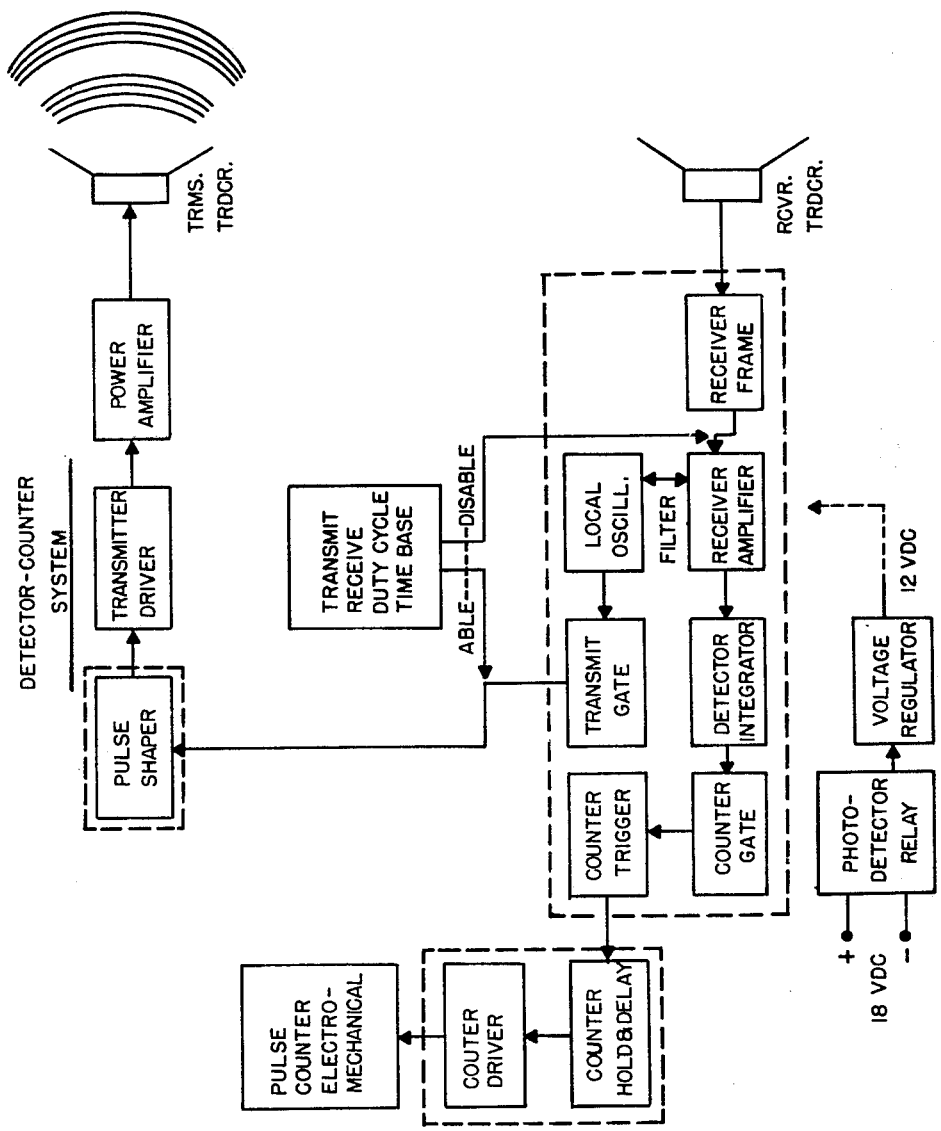
FIG. 1 is a block circuit diagram of SODAR insect detector-counter system.

A low frequency, pulsed transmission-echo receive radar type circuit and counter mechanism (FIG. 1) were designed to operate from an 18 VDC battery power supply. The assembled circuit board, transmit and receive transducers, counter, and photo sensitive switch circuit all were housed in a capped length of 5.1 cm (2 in.) diameter PVC plastic water pipe oriented in a vertical stance. This package adequately protected the system from rain and high humidity encountered at night in fields of cultivated crops. To conserve energy, a photo transistor switch circuit was designed to turn the system off at sunrise and on at sunset, since the target insect species, tobacco budworms, actively fly in response to their sex attractant only at night. The power supply was made of three series-connected 6 VDC lantern batteries to provide the basic voltage required. However, a voltage regulator system provided the transceiver and counter circuits with a regulated 12 volts even though the battery supply voltage may drop to 14.5 volts for several nights of operation.

The transducers, both receive and transmit, were pretuned to a $40 \pm 0.3$ Khz frequency due to their design and the resonant characteristics of their piezoceramic construction material. Hence, the transceiver circuits were tuned to a $40 \pm 0.3$ Khz primary operational frequency. This low frequency was chosen for several reasons. The transmission pattern could be acoustically shaped to cover free air spaces in which a chemical pheromone plume was carried from its dispenser. The chemical dispenser was attached to the PVC pipe housing between the transducers, and the transducers (both transmit and receive) were elevated to about 4 m (12 ft) and pointed downwind. The 40 Khz frequency transmission is attenuated less by the atmosphere than higher frequencies such as 200 Khz to 1 Mhz. Pretuned transducers were available at a reasonable price, and their acoustic sensitivity ($-60$ dB, re 1 volt per microbar)

met the requirements necessary to detect an echo from a flying moth target.

Three SODAR transceivers were constructed, baited with the tobacco budworm pheromone (virelure), and their capabilities tested over fields of cultivated cotton, a preferred host of budworm. Counts made by the transceiver sets were compared with numbers of male moths caught at night in inverted cone traps (Hartstack et al. 1979). Also, direct nighttime visual observations were made to determine the general insect behavior of flying insects attracted to the chemical lure (Hendricks et al. 1977) and transducer site. Comparative field tests were run during a 22-day period in a 4-acre and 10-acre cotton field. Also, field trials were run to determine the operational reliability, effective range of the transceiver, and the acoustical shape of the SODAR set transmission pattern. Transducers were installed vertically, receiver 15 cm (6 in.) above transmitter, at the top of the PVC transceiver housing. In the 4-acre test plot, the transducers were oriented 2.6 m (8 ft) above the cotton plant canopy and aimed horizontally downwind in the direction of the pheromone plume. Insect traps were installed at canopy level from 3 to 10 m (10 to 35 ft) from the transceivers, so moths caught or counted would be from similar environments and the same field population. Two SODAR sets, one baited with pheromone and one not baited, were used for comparative tests in the 4-acre test plot during 8 nights, and then both were baited during an additional 7 nights. In the 10-acre test plot, one SODAR set was baited with virelure and operated for 5 nights. Its counts were compared with the average catch from 3 traps, each baited with 5 female moths, set from 10 to 25 m (30 to 70 ft) from the radar set.

RESULTS

Field trials run in the 4-acre cotton plot (Table 1) showed that the SODAR set counts were significantly higher than average numbers caught in pheromone traps baited with virelure. However, when traps were baited with live female moths and run concurrently with SODAR sets baited with virelure dispensers for 5 nights in the 10 acre plot; trap catches averaged 80.6 moths for 15 trap-nights and SODAR counts averaged 51.60. Greater catches by live females were expected in the 10-acre plot tests, since previous field tests have shown that the best virelure chemical dispenser formulation is about 75–80% as effective as 5 live females used as bait to attract male moths. However, radar sets did count more insects than caught in virelure baited traps set in the 4-acre plot. This was also reasonable since the insect traps are not considered to be 100% effective and do not catch all responding male moths (Lindquist 1978).

Nighttime visual observations revealed that flying male budworm moths did fly upwind to the virelure dispensers fixed between the sonic transducers. The flight approach behavior of more than 40 moths was observed during their sexual responsive period (11 PM–4 AM) for 3 nights. Some moths flew in a direct determinant approach pattern while others followed a zig-zag pattern until they were about 1 meter from the virelure dispenser. From this distance, the moths either dropped to the cotton plants below, circled away at higher altitudes, or they flew directly to the dispenser, closely hovered near it or attempted mating with it.

Moths that flew to the dispenser, either hovering or landing, rarely stayed more than 15 seconds before flying downward to the cotton plants or disappearing horizontally into the darkness over the field. Most of the moths remained at the dispenser for a period less than 10 seconds. All moths observed approaching the virelure dispenser after 11 PM appeared to be tobacco budworms. Indeed, 8 moths in one night were captured after they left the dispenser site and all were identified as male tobacco budworm moths. Adults of other species, *Trichoplusia ni* (Hübner), *Rachiplusia ou* (Guenée), *Pseudoplusia includens* (Walker), and *Alabama argillaceae* (Hubner) were found feeding on nectar of the cotton plants just after sunset. But none of these species were observed later at night approaching the virelure pheromone dispenser at the SODAR transducers. One evening, 15 minutes after sunset, a carpenter bee, *Xylocopa virginica* (Linn.), approach in flight to within 2.5 cm (1 inch) of the transmit transducer, hovered for about 4 seconds and quickly flew away across the 4-acre field. This was the only incident where a species other than tobacco budworm intersected the effective range of the transceiver.

A surrogate (dead budworm moth, wings spread) was tethered on a thread and suspended at various distances in front of the transducers to determine receiver sensitivity and effective range. Sensitivity was adjusted so that an echo from a flying moth would trigger the receiver and counter at a 1 meter distance. Sensitivity could have been increased to detect a moth at 2.6 m, but receiver sensitivity above this level was excessive and triggered the counter circuit because of echos (clutter) from the cotton leaves in the field below the transducers. The effective detection area, or transmission pattern, was shaped as a 30° cone emitted from the transmit transducer. A surrogate was detected at 3.1 m when sensitivity was maximized. A 3.8 cm diam $\times$ 15 cm (1.5 in $\times$ 6 in) cardboard cylinder was mounted in front of the transmit transducer and aimed at the target moth to acoustically shape and further extend the transmission range. However, this approach was not fully tested under field conditions since the broad and variable insect flight approach to a pheromone dispenser may not have coincided with the resultant narrow transmission pattern.

DISCUSSION

Figure 2:
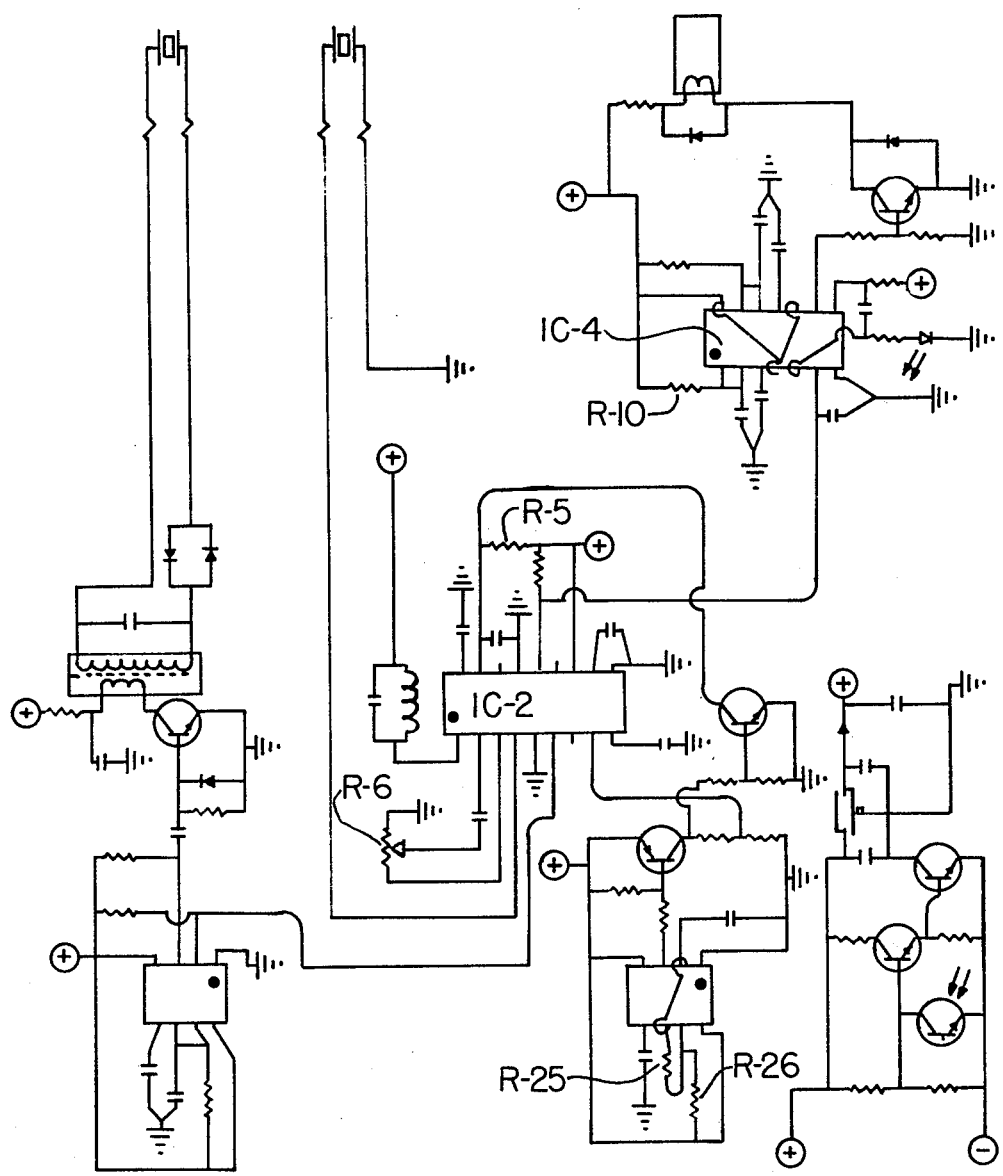
FIG. 2 is a schematic diagram for the insect detector and counter circuits.

The SODAR set circuits (FIG. 2) were designed to give the most realistic counts possible. The two basic operational variables were, of course, transmission power and receiver sensitivity. Power output is determined by components in the power amplifier and output circuits, primarily by resistance of R5 (see schematic, FIG. 2) which may be increased to decrease transmission output. Sensitivity of the receiver is regulated by the potentiometer R6. A thorough discussion of the construction and operation of this SODAR set's primary integrated circuit (LM1812) IC2 was presented by Frederiksen and Howard (1974).

The transmitter pulse duration and rate, and receive mode period also were variables dependent upon the overall flight capabilities of the target species and the insects' behavior while approaching a virelure dispenser. Rapid (25 per sec) transmit pulses were tested and found to be unnecessarily high and rapidly consumed battery power. Yet, one pulse per 2 seconds was evaded by a flying moth, and not all moths that approached the transducer site were counted because they traversed the effective transmission area too soon. Therefore, a transmission pulse rate (determined by R26) of 6 times per second was selected as the optimal compromise between detection and power consumption. Pulse duration was set at 2 ms (by R25) so that transmitted energy would be adequate to provide echoes of sufficient duration to energize the receiver-trigger circuits of IC2 (LM1812). Hence, the transmit-echo receive cycle was repeated every 166 ms; 2 ms transmit mode with receiver off, and 164 ms in receive mode.

The first echo received by IC2 during any one 164 ms nontransmit period provided a gated negative voltage from pin 14 of IC2 which triggered a time delay circuit at pin 6 of IC4 (a dual timer). This energized the LED as an "echo received" indicator. The time delay was determined by R10, and this IC4 circuit held the count for 11 seconds before activating the digital counter-driver circuit which resulted in a summary count of one on the impulse counter. During the 11 seconds delay period, additional trigger impulses from repetitious echoes from the same flying moth did not trigger the count circuits. The delay period or time given as insect to leave the pheromone and transducer site, was adjusted by changing the resistor at R10: 1 megaohm=8 sec. delay, 1.47 megaohm=11 sec. delay, and 2.2 megaohm=15 sec. delay. So that repeated counts of the same insect would be avoided and ample time was allowed for the moth to exist in the effective detection area, an 11 second time delay was determined adequate for the tobacco budworm. However, with this simplistic type of echo processing circuit, it was quite possible that an echo from a second or third moth received during the 11 second hold period would not register as a count. However, the processing of the received echo signals could be made more elaborate by adding time sequencing components, for example, and reduce the chance of missing counts when insects respond in groups that intersect the effective SODAR area all within an 11 second period.

This approach to insect detection demonstrated that a sonic device sensitive enough to detect insects could be constructed, used in the field as a self operating unit, and provided insect count information directly dependent upon the numbers of individuals of single species present and responsive to a particular sex pheromone.

Further development of the echo processing circuits and systems to interface triggered output sequences with data loggers, radio telemetry, or computers could lead to remote radar surveillance of single or unique groups of insect pests and used for their control or studies of population dynamics.

TABLE 1

Comparison of tobacco budworm males caught in pheromone traps with counts made by SODAR sets baited with virelure[a] or unbaited as checks in a 4-acre cotton field. July 24–August 24, 1979.

| Detection Device | Avg. No. per trap-night | No. trap-nights | Numerical range | cal t[b] |
|---|---|---|---|---|
| Inverted cone pheromone traps | 14.32 | 31 | 2–36 | 3.439 |
| Portable radar, baited | 34.42 | 22 | 8–105 | — |
| Transceivers, unbaited check | 1.0 | 8 | 0–5 | — |

[a]Pheromone dispensers contained 20 mg of a mixture of cis-9-tetradecenal in a 16:1 ratio formulated in a 1.27 × 2.54 cm (½ × 1 inch) laminated PVC dispenser.
[b]Difference between trap catches and SODAR set counts was statistically significant at the $P = 0.01$ level (independent t-test).

I claim:

1. A method for sampling flying insect populations using low-frequency sound detecting and ranging in conjunction with a biologically active chemical/pheromone comprising:
    (1) baiting an agricultural area with a pheromone sex attractant specific to a flying insect species;
    (2) luring said flying insect into range of a sound detecting transceiver by means of said pheromone sex attractant;
    (3) transmitting a low-frequency sound wave into contact with said flying insects;
    (4) receiving said sound wave back into a detector, thus producing a detection of said insect;
    (5) recording said detections of said insects over a period of time to produce a count of said flying insects and thus a sampling of flying insect populations.

* * * * *